(12) United States Patent
Dudar

(10) Patent No.: US 10,882,449 B2
(45) Date of Patent: Jan. 5, 2021

(54) VEHICLE LIGHT PLATOON

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 143 days.

(21) Appl. No.: 15/723,540

(22) Filed: Oct. 3, 2017

(65) Prior Publication Data

US 2019/0101933 A1    Apr. 4, 2019

(51) Int. Cl.
| | |
|---|---|
| *B60W 50/029* | (2012.01) |
| *B60Q 11/00* | (2006.01) |
| *G08G 1/00* | (2006.01) |
| *B60W 30/165* | (2020.01) |
| *G05D 1/02* | (2020.01) |

(52) U.S. Cl.
CPC ......... *B60Q 11/005* (2013.01); *B60W 30/165* (2013.01); *B60W 50/029* (2013.01); *G05D 1/0293* (2013.01); *G08G 1/00* (2013.01); *B60Q 11/002* (2013.01); *G05D 2201/0213* (2013.01)

(58) Field of Classification Search
USPC .......................................................... 701/23
See application file for complete search history.

(56) References Cited

U.S. PATENT DOCUMENTS

| | | | | |
|---|---|---|---|---|
| 4,495,444 | A * | 1/1985 | Thomas | H05B 39/10 307/10.8 |
| 5,680,122 | A * | 10/1997 | Mio | G05D 1/0246 180/167 |
| 6,081,756 | A * | 6/2000 | Mio | G05D 1/0293 180/168 |
| 8,519,624 | B2 | 8/2013 | Hattori et al. | |
| 8,736,173 | B2 | 5/2014 | Nishitani et al. | |
| 9,037,389 | B2 * | 5/2015 | You | G08G 1/22 701/117 |
| 9,927,816 | B2 * | 3/2018 | Li | B60K 31/00 |
| 10,040,390 | B2 * | 8/2018 | Dudar | B60Q 1/1423 |
| 2003/0167123 | A1 * | 9/2003 | Nakazawa | G08G 1/166 701/301 |
| 2006/0155428 | A1 * | 7/2006 | Imai | G08G 1/0104 701/1 |
| 2011/0125345 | A1 * | 5/2011 | Parienti | G05D 1/0234 701/2 |
| 2011/0224864 | A1 * | 9/2011 | Gellatly | G01C 21/3679 701/29.5 |
| 2012/0001547 | A1 * | 1/2012 | Nishitani | B60Q 1/50 315/82 |
| 2013/0176031 | A1 * | 7/2013 | Huang | H05B 45/58 324/414 |
| 2014/0009065 | A1 * | 1/2014 | Sasaki | B60Q 1/50 315/80 |

(Continued)

FOREIGN PATENT DOCUMENTS

KR    101324531 B1    11/2013

*Primary Examiner* — Richard A Goldman
(74) *Attorney, Agent, or Firm* — Frank A. MacKenzie; Beiin Bieneman PLC

(57) ABSTRACT

A system includes a processor and a memory. The memory stores instructions executable by the processor to actuate a first vehicle to form a platoon including a second vehicle upon determining that an external light of the first vehicle is in a fault state.

20 Claims, 3 Drawing Sheets

(56) References Cited

U.S. PATENT DOCUMENTS

| | | | |
|---|---|---|---|
| 2015/0042226 A1* | 2/2015 | Hibino | B60Q 1/1423 |
| | | | 315/82 |
| 2015/0127191 A1* | 5/2015 | Misra | G08G 1/143 |
| | | | 701/1 |
| 2016/0071418 A1 | 3/2016 | Oshida et al. | |
| 2016/0350939 A1* | 12/2016 | Cuddihy | H04N 5/23293 |
| 2017/0008521 A1* | 1/2017 | Braunstein | G01C 21/32 |
| 2017/0072967 A1 | 3/2017 | Fendt et al. | |
| 2017/0144598 A1* | 5/2017 | Jeong | B60Q 1/44 |
| 2017/0162051 A1 | 6/2017 | Satoh | |
| 2017/0267175 A1* | 9/2017 | Ichikawa | G01J 1/0238 |
| 2017/0300766 A1* | 10/2017 | Kang | B60Q 1/0023 |
| 2017/0349092 A1* | 12/2017 | Chang | B60Q 11/002 |
| 2018/0029522 A1* | 2/2018 | Gordon | B60Q 5/00 |
| 2018/0066985 A1* | 3/2018 | Gut | F21S 45/70 |
| 2018/0290583 A1* | 10/2018 | Park | B60Q 1/085 |
| 2019/0054851 A1* | 2/2019 | Kim | B60Q 1/143 |
| 2019/0150237 A1* | 5/2019 | Niedermeier | B60Q 11/00 |
| | | | 315/77 |
| 2019/0359131 A1* | 11/2019 | Wama | B60Q 1/0023 |
| 2019/0384294 A1* | 12/2019 | Shashua | G05D 1/0088 |
| 2020/0043254 A1* | 2/2020 | Hase | G08G 1/0112 |
| 2020/0125095 A1* | 4/2020 | Lengsfeld | G05D 1/0246 |
| 2020/0298757 A1* | 9/2020 | Thompson | B60Q 11/005 |

* cited by examiner

VEHICLE LIGHT PLATOON

BACKGROUND

A vehicle is typically equipped with external lights used to navigate the vehicle. An external light may provide illumination to areas outside the vehicle. External lights may provide notice of the vehicle to other vehicles and pedestrians. For example, brake lights provide notice that the vehicle may be actuating a brake system. Further for example, headlights may illuminate an area in front of the vehicle and provide notice of a location the vehicle, e.g., that the vehicle is approaching other vehicles and/or pedestrians. However, such external lights may be in a fault state, i.e., fail to produce light at all and/or at a desired intensity. In such instances, it is a problem that a vehicle cannot operate, and/or cannot operate safely and/or efficiently.

DETAILED DESCRIPTION

Introduction

Figure 1:
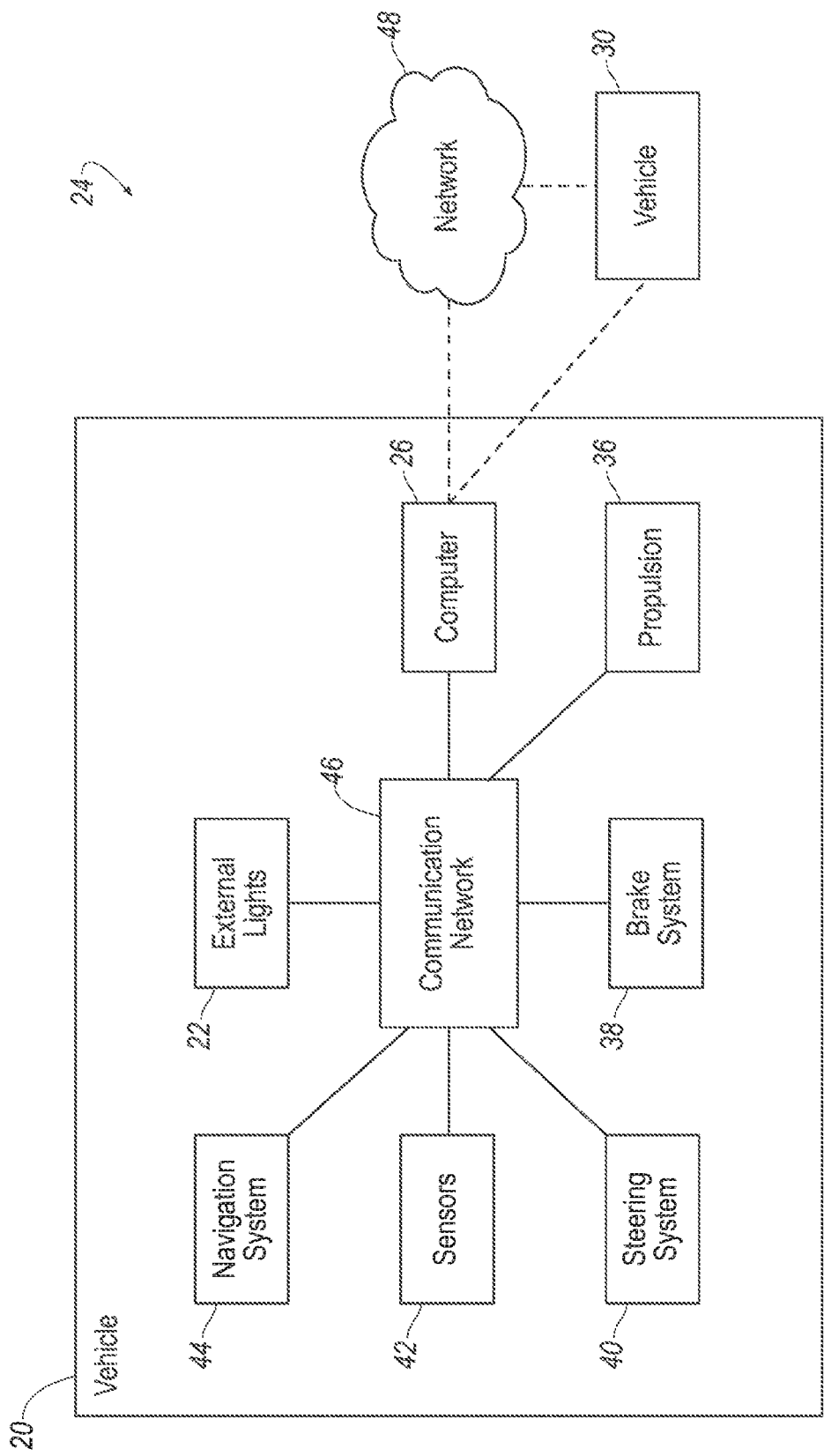
FIG. 1 is a block diagram of components of an example system for forming a platoon including an example vehicle with an external light in a fault state.

A system includes a processor and a memory, the memory storing instructions executable by the processor to actuate a first vehicle to form a platoon including a second vehicle upon determining that an external light of the first vehicle is in a fault state.

The memory may further store instructions executable by the processor to actuate the first vehicle to form the platoon upon determining that the first vehicle is navigating a type of road classified for light-based platoons.

The memory may further store instructions executable by the processor to actuate the first vehicle to disband the platoon upon determining that the first vehicle is navigating a type of road classified for individual vehicles having an external light in a fault state.

The memory may further store instructions executable by the processor to form the platoon including the second vehicle in front of the first vehicle.

The memory may further store instructions executable by the processor to form the platoon upon a determination that the external light in the fault state is mounted at a front of the first vehicle.

The memory may further store instructions executable by the processor to determine that a brightness external to the first vehicle is below a threshold before actuating the first vehicle to form the platoon including the second vehicle.

The memory may further store instructions executable by the processor to actuate the first vehicle to form the platoon including the second vehicle behind the first vehicle.

The memory may further store instructions executable by the processor to form the platoon upon a determination that the external light in the fault state is mounted at a rear of the first vehicle.

The memory may further store instructions executable by the processor to actuate the first vehicle to form the platoon including a third vehicle in front of the first vehicle upon determining that a second external light mounted at a front of the first vehicle is in a fault state.

The memory may further store instructions executable by the processor to determine that a brightness external to the first vehicle is below a threshold before actuating the first vehicle to form the platoon including the third vehicle.

A method includes actuating a first vehicle to form a platoon including a second vehicle upon determining that an external light of the first vehicle is in a fault state.

The method may further include actuating the first vehicle to form the platoon upon determining that the first vehicle is navigating a type of road classified for light-based platoons.

The method may further include actuating the first vehicle to disband the platoon upon determining that the first vehicle is navigating a type of road classified for individual vehicles having an external light in a fault state.

The method may further include forming the platoon including the second vehicle in front of the first vehicle.

The method may further include forming the platoon upon a determination that the external light in the fault state is mounted at a front of the first vehicle.

The method may further include determining that a brightness external to the first vehicle is below a threshold before actuating the first vehicle to form the platoon including the second vehicle.

The determination that the brightness external to the first vehicle is below the threshold may be based on a time of day.

The determination that the brightness external to the first vehicle is below the threshold may be based on data indicating a brightness external to the first vehicle.

The method may further include actuating the first vehicle to form the platoon including the second vehicle behind the first vehicle.

The method may further include forming the platoon upon a determination that the external light in the fault state is mounted at a rear of the first vehicle.

The method may further include actuating the first vehicle to form the platoon including a third vehicle in front of the first vehicle upon determining that a second external light mounted at a front of the first vehicle is in a fault state.

The method may further include determining that a brightness external to the first vehicle is below a threshold before actuating the first vehicle to form the platoon including the third vehicle.

Actuating the first vehicle to form the platoon including the second vehicle may include maintaining a threshold distance between the first vehicle and the second vehicle.

A computer may be programmed to perform the method.

A computer readable medium may store program instructions executable by a computer processor to perform the method.

With reference to the Figures, a problem of navigating a vehicle 20 having one or more external lights 22 in a fault state, i.e., the external light(s) 22 is (are) unable to produce light at least at a specified intensity and/or a fault indication is provided on a vehicle 20 communications bus or the like, is addressed in a system 24 that includes a vehicle computer 26 having a processor and a memory, the memory storing instructions executable by the processor to actuate the vehicle 20 to form a platoon 28 with a second vehicle 30 upon determining that one or more external lights 22 of the vehicle 20 are in the fault state.

The term "platoon" in this disclosure refers to an arrangement of two or more vehicles 20, 30 in which one vehicle 20, 30 maintains a threshold distance D, e.g., 15 feet, behind or in front of another vehicle 20, 30 while both vehicles 20, 30 are navigating, e.g., traveling on a road.

Vehicle

Figure 2:
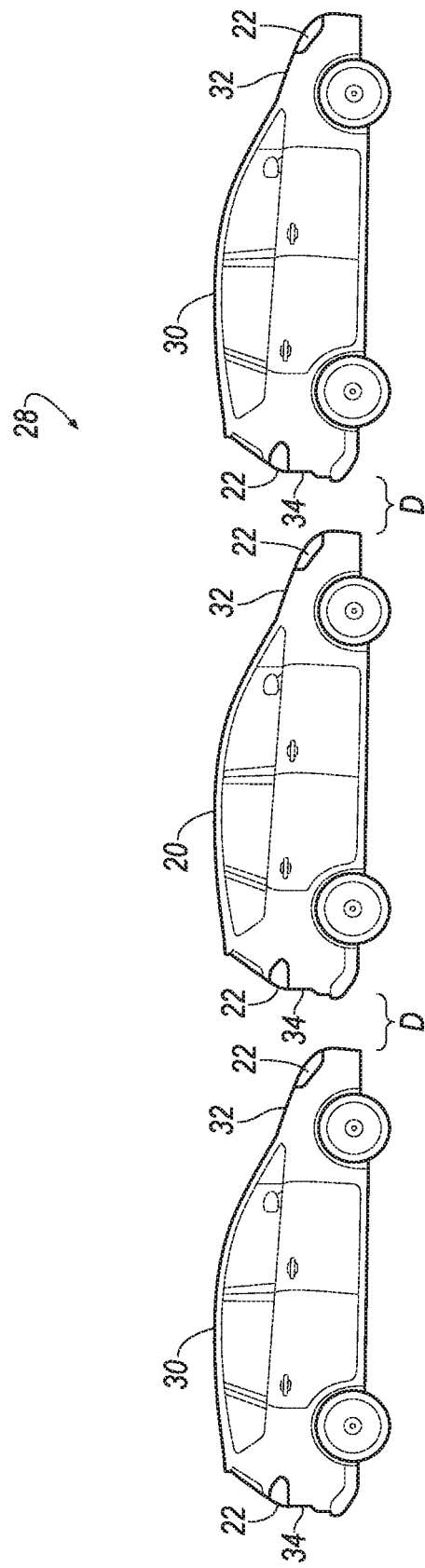
FIG. 2 is a perspective view of the example vehicle of FIG. 1 forming a platoon with other vehicles.

The vehicle 20, as illustrated in FIGS. 1 and 2, may be any passenger or commercial automobile such as a car, a truck, a sport utility vehicle, a crossover vehicle, a van, a minivan, a taxi, a bus, etc. The vehicle 20 has a front 32 and a rear 34, e.g., relative to a usual driving direction of the vehicle 20, relative to an orientation of a driver operating the vehicle 20, etc, i.e., the front 32 faces what is conventionally considered to be forward, and the rear 34 faces what is conventionally considered to be rearward.

The vehicle 20 may operate in an autonomous (e.g., driverless) mode, a semi-autonomous mode, and/or a non-autonomous mode. For purposes of this disclosure, the autonomous mode is defined as one in which each of a propulsion 36, a brake system 38, and a steering system 40 of the vehicle 20 are controlled by one or more vehicle computers 26; in the semi-autonomous mode computer(s) 26 of the vehicle 20 control(s) one or two of the vehicle 20 propulsion 36, brake system 38, and steering system 40; each of these are controlled by a human operator in the non-autonomous mode.

The vehicle 20 may additionally include the external lights 22, sensors 42, a navigation system 44, and an in-vehicle communication network 46 for providing communication between vehicle 20 components such as lights 22, sensors 42, navigation system 44, propulsion 36, brake system 38, steering system 40, etc.

The propulsion 36 of the vehicle 20 translates stored energy into motion of the vehicle 20. The propulsion 36 may be a known vehicle 20 propulsion 36 subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion 36. The propulsion 36 is in communication with and receives input from the vehicle computer 26 and/or from a human driver. The human driver may control the propulsion 36 via an input device, e.g., an accelerator pedal and/or a gear-shift lever.

The brake system 38 can be a conventional vehicle 20 subsystem that can resist the motion of the vehicle 20 to thereby slow and/or stop the vehicle 20. The brake system 38 may include friction brakes such as disc brakes, drum brakes, band brakes, etc.; regenerative brakes; a parking brake; any other suitable type of brakes; or a combination. The brake system 38 can include an electronic control unit (ECU) or the like that actuates the brake system 38 to resist the motion of the vehicle 20, e.g., upon a command from the vehicle computer 26 and/or from a human driver. The human driver may control the brake system 38 via an input device, e.g., a brake pedal.

The steering system 40 is typically a conventional vehicle 20 steering subsystem and controls the turning of the wheels. The steering system 40 is in communication with and receives input from a steering wheel and/or the vehicle computer 26. The steering system 40 may include a rack-and-pinion system with electric power-assisted steering, a steer-by-wire system, or any other suitable system.

The external lights 22 provide illumination external to the vehicle 20, e.g., to illuminate an area outside the vehicle 20, to provide information to vehicles 30 and/or persons outside the vehicle 20, etc. The external lights 22 may be halogen lamps, light emitting diodes, or any other suitable light. The external lights 22 may provide colored, e.g., red, yellow, etc., light, e.g., with a tinted lens. Each external light 22 may include circuits, chips, computing devices, etc., e.g., to actuate the external light 22, to send and receive messages and commands from the vehicle computer 26, etc. The external lights 22 may be mounted at the front 32 and/or rear 34 of the vehicle 20. For example, the external lights 22 may be brake lights, headlights, turn indicators, reverse lights (i.e., lights 22 to illuminate an area rearward of the vehicle 20 when the vehicle 20 is in reverse), etc.

The external lights 22 may actuate between an on state in which light is produced, and an off state in which light is not produced. The external lights 22 may be actuated between the on state and the off state upon an instruction from the vehicle computer 26, e.g., the vehicle computer 26 may transmit a command to the external lights 22, may provide a voltage to the external lights 22, etc., e.g., via the in-vehicle communication network 46. The external lights 22 may be actuated individually, in groups, collectively, etc.

The vehicle 20 sensors 42 may detect internal states of the vehicle 20, for example, wheel speed, wheel orientation, tire pressure, suspension travel, brake sensors, traction control sensors, and engine and transmission variables. For example, the vehicle 20 sensors 42 may detect when one or more external lights 22 are in a fault state. For example, one or more sensors 42 may be voltage sensors configured to detect a voltage across each of the external lights 22.

The vehicle 20 sensors 42 may detect the position and/or orientation of the vehicle 20, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers.

The vehicle 20 sensors 42 may detect the external world, for example, light measurement sensors, photometers, microphones, wind speed measurement sensors, radar sensors, scanning laser range finders, light detection and ranging (LIDAR) devices, and image processing sensors such as cameras.

The vehicle 20 navigation system 44 can determine a location and orientation, e.g., a compass heading direction, of the vehicle 20 according to map data, e.g., by geocoordinates and compass heading direction that can be used to determine a location and orientation of the vehicle 20 on a map.

The map data may specify locations covered by roads as well as data about the roads and locations adjacent and/or proximate to the roads, such as a number of lanes of a road, direction(s) of travel of lanes, parking lot locations, etc. The map data may further include a classification of a type of road associated with various roads of the map data, e.g., a road classified for light-based platoons 28, a road classified for individual vehicles 20, 30 having one or more external lights 22 in a fault state, a road classified for no platooning, etc.

A road classified for light-based platoons 28 is one in which vehicles 20, 30 are permitted to form a platoon 28 with each other where one or more of the vehicles 20, 30 in the platoon 28 has one or more external lights 22 in a fault state. For example, a road with stops, at-grade intersections with other roads, crosswalks for pedestrians, etc., may be classified for light-based platoons 28.

A road classified for light-based platoons 28 may include an identification of a specific type of light-based platoon 28. A type of light-based platoon 28 indicates a mounting position of one or more external lights 22 in a fault state that may be supplemented with light from another vehicle 20, 30 in a platoon 28. For example, a road classified for a forward-facing light-based platoon 28 may be for a platoon 28 including a vehicle 20, 30 having one or more external lights 22 mounted at a front 32 of the vehicle 20, 30 and in a fault state, e.g., the vehicle 20 with the external light 22 mounted at the front 32 of the vehicle 20 and in a fault state may form the platoon 28 with the second vehicle 30 in front of the vehicle 20 to take advantage of the external lights 22 mounted at the front 32 of the second vehicle 30 that are not in a fault state. For example, a road classified for a rear-facing light-based platoon 28 may be for a platoon 28 including a vehicle 20, 30 having one or more external lights 22 mounted at a rear 34 of the vehicle 20, 30 and in a fault state, e.g., the vehicle 20 with the external light 22 mounted at the rear 34 of the vehicle 20 and in a fault state may form the platoon 28 with the second vehicle 30 behind the vehicle 20 to take advantage of the external lights 22 mounted at the rear 34 of the second vehicle 30 that are not in a fault state.

A road classified for individual vehicles 20, 30 having one or more external lights 22 in a fault state is one in which vehicles 20, 30 having one or more external lights 22 in a fault state are permitted to navigate without forming the platoon 28 with another vehicle 20, 30. For example, the road classified for individual vehicles 20, 30 having one or more external lights 22 in a fault state may be a road exclusively for vehicles 20, 30 operating in the autonomous mode.

A road classified for individual vehicles 20, 30 having one or more external lights 22 in a fault state may include an identification of a location on the vehicle 20, 30 of the one or more external lights 22 in a fault state. For example, a road may be classified for an individual vehicle 20, 30 having one or more external lights 22 mounted at a front 32 of the vehicle 20, 30 and in a fault state. For example, a road may be classified for an individual vehicle 20, 30 having one or more external lights 22 mounted at a rear 34 of the vehicle 20, 30 and in a fault state.

Roads may be associated with more than one road classification type. For example, a road exclusively for unhindered vehicular traffic, with no traffic signals, intersections, or property access, and free of any at-grade crossings with other roads or railroads, in contrast to crossings that are not at-grade, i.e., that instead use overpasses and underpasses to cross such road, where access is provided by ramps at interchanges, such that elevations of paths crossing one another allow vehicles 20, 30 to pass over or under each other on respective paths, may be classified for individual vehicles 20, 30 having one or more external lights 22 mounted at the front 32 and in a fault state, and may be classified for light-based platoons 28 including a vehicle 20, 30 having one or more external lights 22 mounted at the rear 24 and in a fault state.

The classification type may be associated with specific lanes of a road, e.g., one lane of a four-lane road could be classified for individual vehicles 20, 30 having one or more external lights 22 in a fault state, while a remainder of the lanes could not be classified as such.

The map data, which can include conventional data, e.g., by geo-coordinates, concerning roads, landmarks, etc., may be stored locally, such as in the vehicle computer 26 memory (discussed below), in the vehicle 20 navigation system 44, etc., and/or remotely, such as in a remote computer.

The vehicle 20 navigation system 44 may rely on information from a global navigation satellite system, distance data from vehicle 20 sensors 42 attached to a drivetrain of the vehicle 20, e.g., a gyroscope, an accelerometer, a magnetometer, and/or other vehicle 20 sensors 42. Exemplary vehicle 20 navigation systems 44 include one or more of known GPS (global positioning system) navigation devices, personal navigation devices, and automotive navigation systems.

The in-vehicle communication network 46 includes hardware, such as a communication bus, for facilitating communication among vehicle 20 components. The in-vehicle communication network 46 may facilitate wired or wireless communication among the vehicle 20 components in accordance with a number of communication protocols such as controller area network (CAN), Ethernet, WiFi, Local Interconnect Network (LIN), and/or other wired or wireless mechanisms.

The vehicle computer 26, implemented via circuits, chips, antennas and/or other electronic components, is included in the vehicle 20 for carrying out various operations and processes, including those described herein. The vehicle computer 26 is a computing device that generally includes the processor and the memory, the memory including one or more forms of computer-readable media, and storing instructions executable by the processor for performing various operations and processes, including those disclosed herein. The vehicle computer 26 may be programmed by storing instructions on the memory that are executable by the processor.

The memory of the vehicle computer 26 further generally stores remote data received via various communications mechanisms; e.g., the vehicle computer 26 is generally configured for communications with vehicle 20 components on the in-vehicle communication network 46, e.g., a controller area network (CAN) bus, and for using other wired or wireless protocols to communicate with devices outside the vehicle 20, e.g., one or more second vehicles 30, etc., e.g., via Universal Serial Bus (USB), Bluetooth®, IEEE 802.11 (colloquially referred to as WiFi®), satellite telecommunication protocols, and cellular protocols such as 3G, LTE, etc. Via the in-vehicle communication network 46 the vehicle computer 26 may transmit messages to various devices in the vehicle 20 and/or receive messages from the various devices, e.g., the propulsion 36, the brake system 38, the steering system 40, the sensors 42, etc., e.g., as discussed herein. Although one vehicle computer 26 is shown for ease of illustration, it is to be understood that the vehicle computer 26 could include, and various operations described herein could be carried out by, one or more computing devices.

The vehicle computer 26 may be programmed to navigate the vehicle 20. For example, the vehicle computer 26 may transmit instructions to the steering system 40, the propulsion 36, and the brake system 38, e.g., via the in-vehicle communication network 46 and based on information from the sensors 42 and the navigation system 44.

The vehicle computer 26 is programmed to determine whether one or more of the external lights 22 are in a fault state. For example, the vehicle computer 26 may receive data, e.g., via the in-vehicle communication network 46, from one more sensors 42 indicating that a specific external light 22 is in a fault state. For example, the sensors 42 may detect a voltage across a specific external light 22 and transmit data indicating the voltage to the vehicle computer 26. The vehicle computer 26 may compare the voltage with a reference value, e.g., 24 volts, to determine whether the specific external light 22 is in a fault state. For example, the vehicle computer 26 may receive a message from one or more external lights 22 indicating that such external light(s) 22 are in a fault state. The message may include an identification of a location of the one or more external lights 22 in a fault state, e.g., mounted at the front 32 of the vehicle 20, mounted at the rear 34 of the vehicle 20, etc. The vehicle computer 26 may use other techniques to determine whether one or more of the external lights 22 are in a fault state.

The vehicle computer 26 may be programmed to determine whether the vehicle 20 is navigating the type of road classified for light-based platoons 28, the type of road classified for individual vehicles 20, 30 having one or more external lights 22 in a fault state, etc. For example, the vehicle computer 26 may receive data, e.g., via the in-vehicle communication network 46, from the navigation system 44 indicating a type of road the vehicle 20 is navigating.

The vehicle computer 26 may be programmed to determine whether a brightness or light intensity, e.g., measured in lux, external to the vehicle 20 is below a threshold value of light intensity, e.g., whether there is insufficient ambient light to operate the vehicle 20 without the external lights 22 mounted at the front 32 of the vehicle 20, e.g., during nighttime hours and/or when there is significant cloud cover necessitating the use of additional illumination external to the vehicle 20, as contrasted with daytime hours where the vehicle 20 may be operated without the need for additional illumination external to the vehicle 20.

The vehicle computer 26 may identify an actual brightness external to the vehicle 20. For example, the vehicle computer 26 may receive data, e.g., via the in-vehicle communication network 46, from one or more sensors 42, e.g., a light measurement sensor supported by the vehicle 20 and positioned to detect ambient light, e.g., supported on a roof or windshield of the vehicle 20 and facing skyward, indicating the brightness or light intensity external to the vehicle 20. The vehicle computer 26 may compare the data from such sensor 42 to a threshold value, e.g., 200 lux. The threshold value may be determined based on an average amount ambient light available during daylight hours on a clear to slightly overcast day. The threshold may be stored in the memory of the vehicle computer 26.

The vehicle computer 26 may estimate brightness external to the vehicle 20, e.g., based on a time of day. For example, the vehicle computer 26 may store a lookup table indicating times of sunset and sunrise, and may compare the time of day to such table, e.g., determining that the brightness external to the vehicle 20 is below the threshold when the time of day is after sunset and before sunrise.

The vehicle computer 26 is programmed to actuate the vehicle 20 to form a platoon 28 with one or more second vehicles 30, e.g., with one or more second vehicles 30 in front and/or behind the vehicle 20.

For example, the vehicle computer 26 may locate a position of the second vehicle 30 relative to the vehicle 20, e.g., based on data received, e.g., via the in-vehicle communication network 46, from the vehicle 20 sensors 42, e.g., proximity sensors, LIDAR sensors, cameras, etc. The vehicle computer 26 may navigate the vehicle 20 to maintain the distance D behind the second vehicle 30, i.e., with the second vehicle 30 in front of the vehicle 20, e.g., based on the position of the second vehicle 30 relative to the vehicle 20.

For example, the vehicle computer 26 may communicate with one or more second vehicles 30 via vehicle-to-vehicle communications, e.g., including DSRC (dedicated short range communications) or the like. Alternatively or additionally, such communication may be transmitted via a wide area network 48. For example, the vehicle computer 26 may transmit an instruction to the second vehicle 30 requesting that the second vehicle 30 navigate to maintain the distance D behind the vehicle 20. Such instruction may include a position of the vehicle 20, e.g., GPS coordinates, the position relative to the second vehicle 30, etc. Such instruction may include instructions sent to the steering system 40, propulsion 36, and/or the brake system 38 of the vehicle 20, e.g., indicating whether the vehicle 20 is accelerating, decelerating, turning, etc. Such instruction may include a planned route of the vehicle 20, e.g., to provide advance notice of when the vehicle 20 will turn, change lanes, etc. Such instruction may include other data the second vehicle 30 may rely on to form the platoon 28 with the vehicle 20. The vehicle computer 26 may receive data from the second vehicle 30 indicating a position of the second vehicle 30, instructions sent to a steering system, a propulsion, and a brake system of the second vehicle 30, a planned route of the second vehicle 30, and/or other data the vehicle 20 may rely on to navigate the vehicle 20 to form the platoon 28 with the second vehicle 30.

The vehicle computer 26 may be programmed to actuate the vehicle 20 to form the platoon 28 with one or more second vehicles 30 upon determining that one or more of the external lights 22 is in a fault state. For example, the vehicle computer 26 may actuate the vehicle 20 to form the platoon 28 with the second vehicle 30 in front of the vehicle 20 upon determining that one or more external lights 22 mounted at the front 32 of the vehicle 20 are in a fault state. For example, the vehicle computer 26 may actuate the vehicle 20 to form the platoon 28 with the second vehicle 30 behind the vehicle 20 upon determining the one or more external lights 22 mounted at the rear 34 of the vehicle 20 are in a fault state.

The vehicle computer 26 may be programmed to actuate the vehicle 20 to disband the platoon 28. In the present context, disbanding a platoon means that at least one vehicle in the platoon has left it, i.e., in the present example, disbanding the platoon means that the vehicle 20 is no longer included in the platoon 28, e.g., the second vehicles 30 may form a platoon with each other after the platoon 28 is disbanded by the departure of the vehicle 20. For example, the vehicle computer 26 may navigate the vehicle 20 without regard to maintaining the distance D behind the second vehicle 30. For example, the vehicle computer 26 may communicate with the one or more second vehicles 30 instructing such vehicles 30 that they are no longer are requested to form the platoon 28 with the vehicle 20. The vehicle computer 26 may actuate the vehicle 20 to disband the platoon 28 upon determining that the vehicle 20 is navigating a type of road classified for individual vehicles 20, 30 having one or more external lights 22 in a fault state.

Wide Area Network

The network 48 (sometimes referred to as the wide area network 48 because it can include communications between devices that are geographically remote from one another, i.e., not in a same building, vehicle, etc.,) represents one or more mechanisms by which remote devices, e.g., the vehicle computer 26, the one or more second vehicles 30, etc., may communicate with each other. Accordingly, the network 48 may be one or more wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 48 include wireless communication networks (e.g., using Bluetooth, IEEE 802.11, etc.), local area networks (LAN) and/or wide area networks (WAN), including the Internet, providing data communication services.

Process

Figure 3:
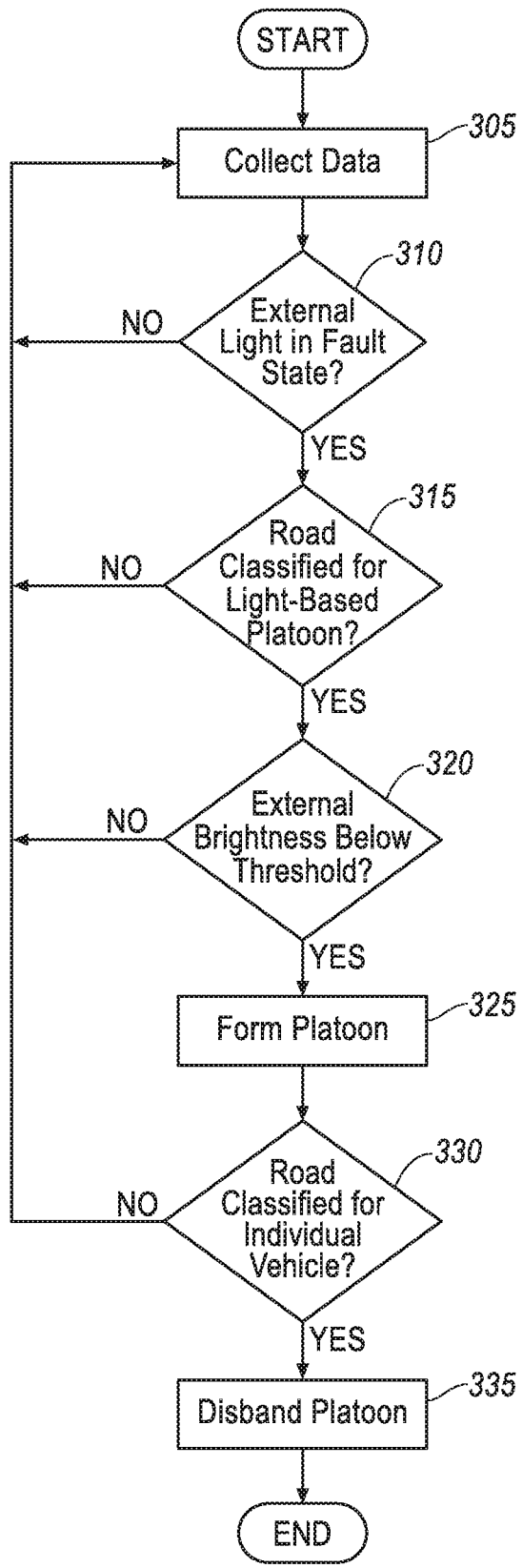
FIG. 3 is a flow chart of an example process of controlling the example system of FIG. 1.

FIG. 3 is a process flow diagram illustrating an exemplary process 300 for operating a vehicle 20 having one or more external lights 22 in a fault state. The process 300 may be executed according to instructions stored in and executable by the vehicle computer 26.

The process 300 begins in a block 305 in which the vehicle computer 26 receives data from components of the vehicle 20, e.g., the sensors 42, the navigation system 44, etc., e.g., via the in-vehicle communication network 46. The vehicle computer 26 may continue to receive data throughout the process 300. Throughout the process 300 in the present context means substantially continuously or at time intervals, e.g., every 200 milliseconds.

Next, at a block 310 the vehicle computer 26 determines whether one or more external lights 22 of the vehicle 20 are in a fault state, e.g., based on data and/or messages from one or more sensors 42, such as voltage sensors, external lights 22, etc., e.g., received via the in-vehicle communication network 46, such as a CAN bus, as described herein. The determination may include locations of the one or more external lights 22 determined to be in a fault state, e.g., mounted at the front 32 of the vehicle 20 and/or mounted at the rear 34 of the vehicle 20. Upon a determination that all external lights 22 of the vehicle 20 are not in a fault state, the process 300 returns to the block 305. Upon a determination that one or more external lights 22 of the vehicle 20 are in a fault state, the process 300 moves to a block 315.

At the block 315, reached because a fault state exists in at least one vehicle 20 external light 22, the vehicle computer 26 determines whether the vehicle 20 is navigating a road classified as a type for light-based platoons 28, e.g., based on data from the navigation system 44, as described above. The determination may be relative to the location of the one or more external lights 22 determined to be in a fault state in the block 310. For example, when the vehicle computer 26 determines that one or more external lights 22 mounted at the front 32 of the vehicle 20 are in a fault state in the block 310, the vehicle computer 26 may then determine whether the vehicle 20 is navigating a road classified as a type for light-based platoons 28 including a vehicle 20, 30 having one or more external lights 22 mounted at a front 32 of the vehicle 20, 30 and in a fault state. For example, when the vehicle computer 26 determines that one or more external lights 22 mounted at the rear 34 of the vehicle 20 are in a fault state in the block 310, the vehicle computer 26 may then determine whether the vehicle 20 is navigating a road classified as a type for light-based platoons 28 including a vehicle 20, 30 having one or more external lights 22 mounted at a rear 34 of the vehicle 20, 30 and in a fault state. Upon a determination that the vehicle 20 is not navigating a type of road classified for light-based platoons 28, the process 300 returns to the block 305. Upon a determination that the vehicle 20 is navigating a type of road classified for light-based platoons 28, the process 300 moves to a block 320.

At the block 320, the vehicle computer 26 determines whether a brightness, e.g., measured in lux, external to the vehicle 20 is below a threshold, e.g., based on a time of day, based on data from the sensors 42, etc. Upon a determination that a brightness external to the vehicle 20 is not below a threshold, the process 300 returns to the block 305. Upon a determination that a brightness external to the vehicle 20 is below a threshold, the process 300 moves to a block 325. The determination of whether the brightness external to the vehicle 20 is below a threshold may be performed depending on the location of the one or more external lights 22 determined to be in a fault state in the block 310. For example, when the vehicle computer 26 determines that one or more external lights 22 mounted at the front 32 of the vehicle 20 are in a fault state in the block 310, the vehicle computer 26 may then perform the determination of whether a brightness external to the vehicle 20 is below a threshold. For example, when the vehicle computer 26 determines that one or more external lights 22 mounted at the rear 34 of the vehicle 20 are in a fault state in the block 310, the vehicle computer 26 may skip the determination of whether a brightness external to the vehicle 20 is below a threshold, and move directly to the block 325.

At the block 325 the vehicle computer 26 actuates the vehicle 20 to form a platoon 28 with one or more second vehicles 30, e.g., via vehicle-to-vehicle communication with the one or more second vehicles 30, based on information from the sensors 42, etc., as described herein. The vehicle computer 26 may actuate the vehicle 20 to from a platoon 28 based on the location of the one or more external lights 22 determined to be in a fault state in the block 310. For example, when the vehicle computer 26 determines that one or more external lights 22 mounted at the front 32 of the vehicle 20 are in a fault state in the block 310, the vehicle computer 26 may then actuate the vehicle 20 to form a platoon with a second vehicle 30 in front of the vehicle 20. For example, when the vehicle computer 26 determines that one or more external lights 22 mounted at the rear 34 of the vehicle 20 are in a fault state in the block 310, the vehicle computer 26 may then actuate the vehicle 20 to form a platoon with a second vehicle 30 behind the vehicle 20. After the block 325 the process 300 moves to a block 330.

At the block 330, the vehicle computer 26 determines whether the vehicle 20 is navigating a type of road classified for individual vehicles 20, 30 having one or more external lights 22 in a fault state. The determination may be relative to the location of the one or more external lights 22 determined to be in a fault state in the block 310. For example, when the vehicle computer 26 determines that one or more external lights 22 mounted at the front 32 of the vehicle 20 are in a fault state in the block 310, the vehicle computer 26 may then determine whether the vehicle 20 is navigating a type of road classified for individual vehicles 20, 30 having one or more external lights 22 mounted at a front 32 of the individual vehicles 20, 30 and in a fault state. For example, when the vehicle computer 26 determines that one or more external lights 22 mounted at the rear 34 of the vehicle 20 are in a fault state in the block 310, the vehicle computer 26 may then determine whether the vehicle 20 is navigating a type of road classified for individual vehicles 20, 30 having one or more external lights 22 mounted at a rear 34 of the individual vehicles 20, 30 and in a fault state. Upon a determination that the vehicle 20 is not navigating a type of road classified for individual vehicles 20, 30 having one or more external lights 22 in a fault state, the process 300 returns to the block 305. Upon a determination that the vehicle 20 is navigating a type of road classified for individual vehicles 20, 30 having one or more external lights 22 in a fault state, the process 300 moves to a block 335.

At the block 335, the vehicle computer 26 actuates the vehicle 20 to disband from the platoon 28 formed in the block 325, e.g., by navigating the vehicle 20 without regard to the distance D, via vehicle-to-vehicle communication, etc., as described herein. After the block 335 the process 300 may end. Alternately, the process 300 may return to the block 305.

CONCLUSION

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The article "a" modifying a noun should be understood as meaning one or more unless stated otherwise, or context requires otherwise. The phrase "based on" encompasses being partly or entirely based on.

What is claimed is:

1. A system, comprising a processor and a memory, the memory storing instructions executable by the processor to:
   determine that an external light source of a first vehicle not in a platoon is in a fault state whereby the first vehicle external light source is unable to produce light at least at a specified intensity; and
   upon determining that the external light source of the first vehicle is in the fault state, actuate the first vehicle to form a platoon including a second vehicle.

2. The system of claim 1, wherein the memory further stores instructions executable by the processor to actuate the first vehicle to form the platoon upon determining that the first vehicle is navigating a type of road classified for light-based platoons.

3. The system of claim 1, wherein the memory further stores instructions executable by the processor to actuate the first vehicle to disband the platoon upon determining that the first vehicle is navigating a type of road classified for individual vehicles having an external light in a fault state.

4. The system of claim 1, wherein the memory further stores instructions executable by the processor to form the platoon including the second vehicle in front of the first vehicle.

5. The system of claim 4, wherein the memory further stores instructions executable by the processor to form the platoon upon a determination that the external light in the fault state is mounted at a front of the first vehicle.

6. The system of claim 1, wherein the memory further stores instructions executable by the processor to determine that a brightness external to the first vehicle is below a threshold before actuating the first vehicle to form the platoon including the second vehicle.

7. The system of claim 1, wherein the memory further stores instructions executable by the processor to actuate the first vehicle to form the platoon including the second vehicle behind the first vehicle.

8. The system of claim 7, wherein the memory further stores instructions executable by the processor to form the platoon upon a determination that the external light in the fault state is mounted at a rear of the first vehicle.

9. The system of claim 8, wherein the memory further stores instructions executable by the processor to actuate the first vehicle to form the platoon including a third vehicle in front of the first vehicle upon determining that a second external light mounted at a front of the first vehicle is in a fault state.

10. The system of claim 9, wherein the memory further stores instructions executable by the processor to determine that a brightness external to the first vehicle is below a threshold before actuating the first vehicle to form the platoon including the third vehicle.

11. A method, comprising:
    determining that an external light source of a first vehicle not in a platoon is in a fault state whereby the first vehicle external light source is unable to produce light at least at a specified intensity; and
    upon determining that the external light source of the first vehicle is in the fault state, actuating the first vehicle to form a platoon including a second vehicle.

12. The method of claim 11, further comprising actuating the first vehicle to form the platoon upon determining that the first vehicle is navigating a type of road classified for light-based platoons.

13. The method of claim 11, further comprising actuating the first vehicle to disband the platoon upon determining that the first vehicle is navigating a type of road classified for individual vehicles having an external light in a fault state.

14. The method of claim 11, further comprising forming the platoon including the second vehicle in front of the first vehicle.

15. The method of claim 14, further comprising forming the platoon upon a determination that the external light in the fault state is mounted at a front of the first vehicle.

16. The method of claim 11, further comprising determining that a brightness external to the first vehicle is below a threshold before actuating the first vehicle to form the platoon including the second vehicle.

17. The method of claim 11, further comprising actuating the first vehicle to form the platoon including the second vehicle behind the first vehicle.

18. The method of claim 17, further comprising forming the platoon upon a determination that the external light in the fault state is mounted at a rear of the first vehicle.

19. The method of claim 18, further comprising actuating the first vehicle to form the platoon including a third vehicle in front of the first vehicle upon determining that a second external light mounted at a front of the first vehicle is in a fault state.

20. The method of claim 19, further comprising determining that a brightness external to the first vehicle is below a threshold before actuating the first vehicle to form the platoon including the third vehicle.

* * * * *